United States Patent [19]

Payne et al.

[11] 3,968,269

[45] July 6, 1976

[54] PROTEIN FOOD PRODUCT AND METHOD OF MAKING

[75] Inventors: Bernard M. Payne, St. Charles; John R. Cloute; Edward A. Johnson, both of St. Louis, all of Mo.; Arthur V. Brown, Jr., Fultz, Ill.; Edward V. Oborsh, Ballwin, Mo.

[73] Assignee: Ralston Purina Company, St. Louis, Mo.

[22] Filed: June 4, 1975

[21] Appl. No.: 583,361

Related U.S. Application Data

[63] Continuation of Ser. No. 378,490, July 12, 1973, abandoned, which is a continuation-in-part of Ser. No. 193,709, Oct. 29, 1971, abandoned.

[52] U.S. Cl. ............................... 426/629; 426/632; 426/634; 426/643; 426/644; 426/646; 426/802
[51] Int. Cl.$^2$ ..................... A23J 3/00; A23L 1/20; A23L 1/31; A23L 1/325
[58] Field of Search ........... 426/104, 641, 629, 634, 426/632, 643, 644, 646, 802

[56] References Cited
UNITED STATES PATENTS 3,047,395  7/1962  Rusoff et al. ..................... 426/104
3,488,770  1/1970  Atkinson ........................... 426/104

*Primary Examiner*—James R. Hoffman
*Attorney, Agent, or Firm*—Veo Peoples, Jr.; Virgil B. Hill

[57] ABSTRACT

A novel protein food product having a porous expanded structure with the texture and organoleptic properties of meat, is produced by a process which comprises: forming a mixture of a vegetable protein containing material and a meat source in an amount of between about 5 to 80% by weight, said mixture having a protein content on a dry basis of at least about 25% by weight, followed by extrusion of said mixture to form a porous expanded food product. The extrusion of a meat source and vegetable protein material provides a product having the economic and functional advantages of a simulated meat piece derived solely from a vegetable protein containing material, with the palatability of a real piece of meat because of the use of a meat source in the product.

16 Claims, No Drawings

PROTEIN FOOD PRODUCT AND METHOD OF MAKING

This application is a streamline continuation of application Ser. No. 378,490, filed July 12, 1973 which was a continuation-in-part of application Ser. No. 193,709 filed Oct. 29, 1971, both are now abandoned.

BACKGROUND OF THE INVENTION

This invention relates to a novel protein food product and method of making the same.

A substantial effort in the food industry has been directed towards the production of meat analogs, or products which resemble meat in flavor and texture, but are derived from other protein sources, such as vegetable protein. A great deal of research has been centered in the conversion of vegetable protein sources such as defatted oilseed meals into meat simulating products. This research has, therefore, been directed towards two objectives, including the reproduction of the textural or organoleptic properties of meat, as well as the minimization or masking of the "bean-like" flavors that are derived from vegetable protein sources such as soybeans, once the textural properties are reproduced.

Reproduction of the textural properties of real meat has been successfully achieved by extruding a ground, solvent extracted oilseed meal such as defatted soybean meal under conditions of elevated temperature, pressure and moisture to achieve an expanded, textured product. Such products and methods for their production are essentially described in U.S. Pat. Nos. 3,496,858 and 3,488,770. The extruded products, either prior to drying or after drying and upon rehydration, are resilient in texture, with the masticatory properties of the muscle tissue of meat.

While the art has generally been successful in the simulation of the textural properties of meat, so that a food of realistic textural characteristics can be produced nevertheless, it has not been entirely successful in masking or eliminating the undesirable bean-like flavors which are characteristic of vegetable protein sources such as soybeans. Depending on the formulation in which the expanded food product is used, it may create a marginal palatability situation or one where the economic advantages of employing a more readily available protein source is offset by a decrease in palatability. This, therefore, requires critical and careful control of flavorants for food products of this type to minimize this problem. Another approach has been an attempt to extract these expanded products with hot water in an attempt to leach out the undesirable flavors, such as described in U.S. Pat. No. 3,142,571. Such an additional step in producing a product such as a pet food adds to the cost involved, and thus is economically undesirable. It may, furthermore, be unsuccessful in achieving a substantial increase in palatability by removal of objectionable flavors, and, thus still require stringent control of added flavorants for the masking of bean-like flavors.

The present invention is, therefore, directed towards the production of a novel protein food product which has the desirable flavor of real meat, while retaining the economic and functional advantages of employing a vegetable protein source. This novel food piece comprises an extruded mixture of a meat source and a vegetable protein source such as oilseed meal, oilseed protein isolate or similar material. The resultant product has a texture substantially identical to the extruded soy products described above, and yet the flavor of the meat source is retained. The novel protein product of this invention may be employed in human food such as stews, clam chowders, or the like or canned pet foods; since it is sufficiently stable to retain its integrity after retort processing. It can also be dried after extrusion, to provide a dry food product which upon rehydration with water, simulates the textural and masticatory properties of meat, but with the added advantage of having the flavor of a cooked meat piece.

Fresh animal meat and oilseed meals have heretofore been combined for extrusion although with a significant proportion of farinaceous materials, as described in U.S. Pat. No. 3,447,929. The disadvantages of such a product include a non-resilient texture with the inability to survive abrasive action such as chewing along with an inherent structural instability in a hot aqueous medium. Thus, although the flavor of such a product is excellent, it lacks the desired structural characteristics of an extruded oilseed material.

SUMMARY OF THE INVENTION

The instant invention provides a process for the production of a novel protein food piece having the flavor of meat which comprises: forming a mixture of a meat source and a vegetable protein source; wherein the meat source is present in an amount of between about 5 to 80% by weight of the mixture, said mixture having a protein content on a dry basis of at least about 25% by weight and, extruding the mixture under conditions of elevated temperature and pressure through a restricted orifice into an environment of lower pressure, thereby providing a dense, expanded protein product with the taste of meat, but with the textural characteristics of an extruded vegetable protein piece.

More specifically, the instant invention combines an oilseed material such as soybeans, cottonseed and peanuts in meal or isolate form with a meat source in proportions such that the meat source is present in an amount of between about 5 to 80% by weight and the mixture has a protein content on a dry basis of at least about 25% by weight. The moisture content of such a combination is maintained below about 50% by weight, and the fat is maintained below about 12% by weight. The described formulation is then extruded at temperatures exceeding 210°F., to achieve a flavorful plasticized dispersion of the meat source and the oilseed material, which is then expanded by exposure to atmospheric temperature and pressure, thereby forming a resilient, meat-like chunk having the flavor of a cooked piece of meat, while retaining the structural characteristics of an expanded oilseed material.

The resultant product is of a high degree of palatability because of its natural meat flavor, with the economic advantages of an extruded oilseed product along with the functional characteristics of chewiness and structural stability in water.

It is, therefore, an object of the instant invention to provide a novel food product which comprises a mixture composed substantially of a meat source and a vegetable proteinaceous material.

It is an object of the instant invention to provide a process for the production of a food product with the taste and flavor of a meat source with the functional characteristics of an extruded vegetable protein material.

It is a further object of the instant invention to provide a process for the production of a novel protein food product with the exercise of control over proportions of meat source employed, moisture, and fat.

DESCRIPTION OF THE PREFERRED EMBODIMENTS

The instant invention involves the selection of starting materials which comprise both a meat source and a vegetable protein source. The vegetable protein source that may be employed in the instant invention preferably includes oilseed materials such as isolates, concentrates or meals derived from soybeans, cottonseed, peanuts, and other oilseeds. The particular type of oilseed material which should be employed is not intended to be limiting although it should preferably be relatively low in fat, therefore defatted by solvent extraction or similar means. The particular fat content of the oilseed meal employed is not intended to be limiting since it is the fat control of the mixture of the meat source and vegetable protein source which is important, although because of the normally high fat content of the meat source, in order to control the fat level on the mixture below the prescribed level, it is preferred that a substantially defatted oilseed material such as concentrate or isolate be employed; having an oil content less than about 2% by weight, and preferably less than about 0.5% by weight.

The meat source which may be employed in the instant invention includes typically the following, although a very broad definition is to be given to the term "meat source." Among the meat sources suitable are fresh or raw meat, meat by-products, poultry meal, fish meal, rendered meat, meat meal, as well as meat and bone meal.

For purposes of this application, "fresh" means non-dehydrated and is meant to include frozen materials. "Animal" is used in the broadest possible sense as meaning members of the kingdom animalia and specifically includes mammals, both land based and aquatic, fowl, fish and crustaceans. Meat and meat by-products are defined by the association of American Feed Control Officials (AAFCO) as follows: the feed control officials have defined the terms "meat" and "meat by-products" as applying to the fresh material from slaughtered animals. "Meat is the clean, wholesome flesh derived from slaughtered mammals and is limited to that part of the striated muscle which is skeletal or that which is found in the tongue, in the diaphragm, in the heart, or in the esophagus, with or without the accompanying and overlying fat and the portions of skin, sinew, nerve, and blood vessels which normally accompany the flesh. If it bears a name descriptive of its kind it must correspond thereto." "Meat by-products is the non-rendered, clean, wholesome part of the carcass of slaughtered mammals such as lungs, spleens, kidneys, brains, liver, stomach, and intestines free from their contents; it does not include skin, horns, teeth, hoofs, and bones. If it bears a name descriptive of its kind it must correspond thereto."

The policy of the A.A.F.C.O. establishes that "the term 'meat' and 'meat by-products' when applied to the corresponding portions of the animals other than cattle, swine, sheep, and goats shall be used in qualified form, as, for example, 'horse meat by-products', 'reindeer meat by-products', etc.", and, bearing in mind the definition of animals given above, the same terminology will be used in this application.

Dehydrated meat sources such as dried meat, poultry meal, fish meal, and meat meal as well as meat and bone meal are suitable as meat sources in the instant invention with any of these sources comprising "cooked meat" material which is dehydrated and then ground. Typically, meat meal and meat and bone meal will have a protein content on the order of 50%, with a fat content of about 10 to 12%, with the ash content being primarily dependent on the bone meal content. If bone meal is present, the ash content will be on the order of about 30%.

The meat source and the oilseed meal are mixed together, in proportions such that the meat source is present in an amount of between about 5 to 80% by weight of said mixture and the mixture has a protein content on a dry basis of at least about 25% by weight. This percentage range of addition for the meat source has been determined to be essential for producing an expanded product pursuant to the instant invention. At least about 5% of the meat source is necessary so that a meat flavor in the extruded protein piece is provided; levels lower than this fail to provide the requisite degree of flavor and, as a consequence, a reduction in palatability is observed. At levels above 80% by weight, the mixture becomes difficult to extrude, primarily because fat and moisture control becomes difficult at this high of a level of meat. Ordinarily, where the meat source level exceeds about 80% by weight of the mixture, the mixture is nearly impossible to convey into the extruder by any conventional apparatus and forms a sticky mass of material.

Although the above ranges of meat source represent operable percentages, nevertheless, preferred levels are on the order of 20 to 50% by weight of the meat source in the extruded product to achieve a high degree of palatability in the final product, and at the same time producing an expanded product with the chewy texture and masticatory characteristics of a real piece of meat.

In addition to the meat source and oilseed material, the mixture may include minor percentages of farinaceous material, dyes, minerals, etc., although the percentage of farinaceous material should preferably not exceed about 10% by weight of the mixture. For example, if the level of farinaceous material in the final product is above 40% by weight, the product has no structural integrity in water and is similar to the product described in U.S. Pat. No. 3,447,929. Lower levels of farinaceous material can also disrupt the expanded proteinaceous matrix, thereby creating the requirement that the instant formulation omit substantial proportions of farinaceous material.

It may be desirable to include various additives to the proteinaceous mixture for extrusion improvement including such additives as acetic acid, mineral acids or a sulfur type reagent as described in U.S. Pat. No. 3,496,858. Any of these materials provide a beneficial effect on the extrusion conditions, thereby improving their yield and operability. The addition of various additives for the purpose of improving extrusion is not intended, however, to be a limiting feature on the instant invention since the proteinaceous mixture of a meat source and oilseed material are entirely operable for extrusion without regard to such an additive.

It is preferred, in general, to keep the moisture level on the proteinaceous mixture before extrusion below about 50% by weight. Typically, the moisture content should be controlled between about 20 to 50% by weight, with the exact concentration being also dependent on the fat content of the mixture and the capabilities of the extruder. Moisture level here is meant to include all moisture present in the ingredients of the preextrusion mixture as well as any moisture that may be added prior to extrusion.

It is also generally preferred that the fat concentration of the proteinaceous mixture be controlled below about 12% by weight, with this to some extent dictating the exact percentage of meat source to be employed. Typically, however, the formulation of the mixture which includes less than 80% by weight of the meat source will provide a fat level below this level. Therefore, these two parameters are proportioned with respect to each other, and the control of one also provides control of the other, absent any substantial contribution to the fat content by the vegetable protein source, or by the separate addition of fat. Therefore, when the fat and moisture level of both the meat source and oilseed material is known, either by sample analysis or by previously published data, the amounts of each can easily be calculated to reach a desired set of values for extrusion.

After formulation of the mixture, it is then extruded under conditions of elevated temperature and pressure, with the temperature being at least about 212°F., and preferably between about 275° and 450°F. The pressures in the extruder are elevated to several hundred pounds per square inch or higher.

A combination of the desired temperature and pressure plasticizes the proteinaceous mixture and converts it into a flowable mixture that is extruded through a restricted orifice into an environment of lower temperature and pressure, thereby forming a porous expanded structure, and hence a novel protein product with the taste and flavor of the added meat source, with the functional characteristics of a expanded, textured product derived from a defatted oilseed material.

The extrudate, after formation, is sliced into small pieces by a rotating knife located adjacent to the restricted orifice after which the pieces were dried to equilibrium moisture content. The dried pieces are then suitable for hydration or cooking in boiling water without disintegration and are highly palatable because of the meat source employed. They may be employed in a canned food, fed dry, or in a "soft moist" food product employing a suitable preservative system.

The following examples of the product and process of the instant invention describe the instant invention in terms of specific embodiments.

EXAMPLE 1

A solvent extracted soybean meal having a fat content of about 0.5% and a protein content of about 50% by weight was combined with fresh liver and five different proteinaceous mixtures were formed as indicated below. One mixture omitted any liver addition at all. All five formulations included 454 grams of iron oxide No. 20 and 227 grams of sulfur as an extrusion additive. The liver was frozen, and ground in a meat grinder so that it passed a ¼ inch plate. These ground meat pieces were then combined with the defatted soy meal to form the described mixtures, whereby each mass was placed in a preconditioner and the moisture levels raised to the indicated levels on all batches. The dampened mass was then conveyed to an extruder whereby the screw was rotating at 125 r.p.m. The exit temperature of the extrudate was found to vary between 354° and 378°F. with an average temperature of 370°F. After extrusion, the extrudate from each batch was cut with a series of four rotating blades attached to a common hub mounted on the extruder head. After extrusion, the cut extrudate in the form of small meat-like pieces was dried to about 10% moisture. Analyses were furthermore performed on each batch at the mixing stage, at the feeder exit from the preconditioner into the extruder, after extrusion and after drying. Analyses were performed for moisture by standard oven drying procedures, protein by Kjeldhal techniques, fat via ether extraction, fiber and ash by methods described in *AOAC Methods of Analysis*, Vol XI. The formulation for each batch, and analytical data are listed below.

TABLE 1

Soy/Liver — Batch Formulations (500 lbs. Batches)

| | Soy Meal (pounds) | Sulfur (grams) | Iron Oxide No. 20 (grams) | Liver (pounds) |
|---|---|---|---|---|
| 100% Soy | 500 | 227 | 454 | 0 |
| 10% Liver | 450 | 227 | 454 | 50 |
| 20% Liver | 400 | 227 | 454 | 100 |
| 30% Liver | 350 | 227 | 454 | 150 |
| 40% Liver | 300 | 227 | 454 | 200 |

TABLE 2(a)

Analysis at Mixer
Liver, % of Mixture

| | 0 | 10 | 20 | 30 | 40 |
|---|---|---|---|---|---|
| Moisture | 10.60 | 22.10 | 22.30 | 26.30 | 31.3 |
| Protein | 47.80 | 42.90 | 43.90 | 40.30 | 39.4 |
| Fat | 1.21 | 1.94 | 1.74 | 2.04 | 2.04 |
| Fiber | 3.67 | 2.79 | 2.84 | 2.58 | 2.32 |
| Ash | 4.72 | 5.19 | 5.24 | 4.99 | 4.40 |

TABLE 2(b)

Analysis at Feeder Exit (steam added to all but 40%)
Liver, % of Mixture

| | 0 | 10 | 20 | 30 | 40 |
|---|---|---|---|---|---|
| Moisture | 41.60 | 46.80 | 46.30 | 47.30 | 43.20 |
| Protein | 32.40 | 33.20 | 31.20 | 30.60 | 32.90 |
| Fat | 0.53 | 0.88 | 0.92 | 1.13 | 1.21 |
| Fiber | 2.24 | 1.91 | 1.93 | 1.80 | 2.13 |
| Ash | 3.54 | 3.77 | 3.67 | 3.69 | 3.87 |

Table 2(C)

Analysis after Extrusion (wet)
Liver, % of Mixture

| | 0 | 10 | 20 | 30 | 40 |
|---|---|---|---|---|---|
| Moisture | 36.60 | 41.50 | 45.00 | 43.30 | 41.80 |
| Protein | 35.10 | 32.90 | 31.10 | 40.00 | 33.00 |
| Fat | 0.17 | 0.28 | 0.17 | 0.49 | 0.94 |
| Fiber | 2.24 | 2.20 | 1.87 | 2.02 | 2.07 |
| Ash | 3.48 | 3.87 | 3.51 | 3.74 | 3.70 |

TABLE 2(d)

Analysis after Extrusion & Drying
Liver, % of Mixture

| | 0 | 10 | 20 | 30 | 40 |
|---|---|---|---|---|---|
| Moisture | 8.60 | 14.50 | 10.40 | 8.58 | 10.10 |
| Protein | 48.50 | 47.30 | 50.10 | 51.00 | 50.40 |
| Fat | 3.15 | 3.43 | 3.54 | 4.04 | 4.23 |
| Fiber | 3.71 | 3.49 | 3.24 | 3.24 | 3.05 |
| Ash | 5.33 | 5.70 | 5.75 | 5.93 | 5.44 |

Liver Extrusion — Bushel Weight Data

| | Lbs/Bushel Weight Out of Extruder | Lbs/Bushel Weight Out of Dryer |
|---|---|---|
| All Soy | 14 – 15 | 12 – 13 |
| 10% Meat | 15½ | 13 – 13½ |
| 20% Meat | 19 | 14½ – 15 |
| 30% Meat | 17 | 15 |

TABLE 2(d)-continued

| 40% Meat | 20 | 18 |
|---|---|---|

The extrudates from all batches were flexible, resilient formed pieces with the lowest moisture level formulation, showing the least expansion. The four batches containing liver, had the chewy texture of an expanded product derived from the extruded soybean meal, although as the percentage of liver increased, the density of the fiber increased, as evidenced by the increase in bushel weight. The expanded product from those batches which contained the liver had an aroma substantially similar to that of liver itself with the resilient characteristics of the expanded product derived entirely from the extrusion of soybean meal.

EXAMPLE 2

Five different proteinaceous mixtures were formulated, and extruded to yield an expanded product generally as described in Example 1. Each of the five mixtures incorporated a different meat source. Formulas for these mixtures are given below:

| Formula 1 | | Formula 2 | | Formula 3 | |
|---|---|---|---|---|---|
| Ingredient | % | Ingredient | % | Ingredient | % |
| Soy Meal | 69.862 | Soy Meal | 69.862 | Soy Meal | 84.659 |
| Chicken | 29.941 | Anchovy/Mackeral | 29.941 | Liver No. 420 | 14.939 |
| Sulfur | 0.1976 | Sulfur | 0.197 | Iron Oxide | 0.252 (color) |
| | | | | Sulfur | .148 |

| Formula 4 | | Formula 5 | |
|---|---|---|---|
| Ingredient | % | Ingredient | % |
| Soy Meal | 79.679 | Soy Meal | 59.733 |
| Liver | 19.920 | Liver | 39.820 |
| No. 420 Iron Oxide | 0.252 | No. 420 Iron Oxide | 0.253 |
| Sulfur | 0.148 | Sulfur | 0.198 |

The expanded products produced from each of these five formulas were then separately hand packed into cans and sealed. Thereafter, each formula was held in a retort device at 250°F. for 60 minutes followed by cooling of each can. All of the cans were opened and the condition of the simulated meat pieces evaluated. In all cases, the pieces were plump and soft but resilient and visually resembled pieces of meat. The liver containing samples were judged to be most like its meat source on the basis of color, texture and mouthfeel. All pieces retained their expanded structure and texture without any degree of disintegration during the cooking operation. The pieces were adjudged to resemble expanded soy fibers in cooking characteristics with the added advantages of a texture-like that of the meat source employed with its taste and aroma.

EXAMPLE 3

Three batches designated A, B and C were formulated from the described meat source and vegetable protein source indicated and then extruded in a manner similar to that set forth in Example 1.

Batch A

| | Weight | Percent |
|---|---|---|
| Defatted Soybean Meal (40% protein) | 150 lb. | 73.4% |
| Meat and Bone Meal | 50 lb. | 24.4% |
| Sulfur | 100 g. | |

Batch A-continued

| | | |
|---|---|---|
| Acetic Acid | 2 lb. | |
| Water | 2 lb. | |
| Dye | 150 g. | |

Batch B

| | Weight | Percent |
|---|---|---|
| Defatted Soy Meal (40% protein) | 35 lb. | 34.2% |
| Defatted Soy Meal (70% protein) | 25 lb. | 24.4% |
| Meat and Bone Meal | 40 lb. | 39.1% |
| Acetic Acid | 1 lb. | |
| Water | 1 lb. | |
| Sulfur | 50 g. | |
| Dye | 75 g. | |

Batch C

| | Weight | Percent |
|---|---|---|
| Defatted Soybean Meal (49% protein) | 60 lb. | 59.96% |
| Partially Defatted Beef Fatty Tissue | 40 lb. | 40.0 % |
| FD&C No. 5 (Yellow) | 6 g. | |
| Sulfur | 22 g. | |

All of the above batches were formulated using a meat source other than raw or fresh meat and were determined to produce expanded products having the resilient chewy texture of fibers derived from extruded soy protein, but with the added flavor and aroma of the added meat source. All of the expanded products were determined to have good structural integrity in water without disintegration or deterioration of the meat-like pieces.

EXAMPLE 4

Pieces of the expanded protein product produced pursuant to Example 1, containing 30% by weight of spleens with the defatted soybean meal were comparatively tested against the product produced pursuant to Example 3 in U.S. Pat. No. 3,447,929 containing chicken, soybean meal, and farinaceous ingredients. The means of testing was as follows:

The comparative sizes of each sample were compared by placing on the ¼ inch sieve, and both were found to have essentially the same size distribution. Thereafter, 15 grams of each product was placed in boiling water for 15 minutes. Pieces of the product produced pursuant to the instant invention swelled, indicating water adsorption, while the pieces produced pursuant to U.S. Pat. No. 3,447,929 actually shrank in size, as is characteristic of extruded farinaceous materials.

Following this, samples of both products were again placed on the ¼ inch sieve and after sieving, it was observed that all of the pieces of product produced pursuant to the instant invention remained on the sieve, while only three pieces of the product of U.S. Pat. NO. 3,447,929 failed to pass through the sieve thereby evidencing the general disintegration of this product in boiling water. A piece of each product was crushed between the fingers with the product of this invention being observed as relatively tough and resilient, while the product of U.S. Pat. No. 3,447,929 was nonresilient, pasty in character and crumbled easily.

EXAMPLE 5

An 800 pound mixture of a meat source and a vegetable protein source was prepared containing the following weight percentage of ingredients:

| Ingredient | Weight % |
|---|---|
| Soybean Protein Isolate (95% protein) | 29.58 |
| Meat and Bone Meal | 70.0 |
| Sulfur | .3 |

-continued

| Ingredient | Weight % |
|---|---|
| Iron Oxide | .165 |

This mixture was then fed into a preconditioner on the extruder at a temperature of 195°F. and the moisture level raised to the indicated level. The mixture at this stage of the process had the following analysis.

| | % |
|---|---|
| Fat | 8.4 |
| Protein | 59.1 |
| Moisture | 22.6 |

The dampened mass was then conveyed to an extruder operating at a temperature of 350°F. The mixture was extruded at this temperature and after extrusion the extrudate was cut with a rotating knife attached to the extruder. Pieces of the extrudate were dried to a moisture level of about 10%, and then placed in boiling water at 212°F. for 15 minutes. Pieces of the extrudate were observed to have good structural integrity in the boiling water with some disintegration but with essentially the integral shape of the pieces retained. The pieces visually resembled pieces of meat, on the basis of color and texture.

EXAMPLE 6

An 800 pound mixture of a meat source and a vegetable protein source was prepared containing the following weight percentage of ingredients;

| Ingredient | Weight % |
|---|---|
| Soybean Protein Isolate (95% protein) | 44.5 |
| Meat and Bone Meal | 55.0 |
| Sulfur | .3 |
| Iron Oxide | .165 |

The mixture was fed into a preconditioner on the extruder maintained at a temperature of 195°F., and the moisture level raised to the indicated level. The mixture at this stage of the process had the following analysis.

| | % |
|---|---|
| Fat | 6.8 |
| Protein | 51.9 |
| Moisture | 29.4 |

The dampened mass was then extruded as set forth in Example 5 and the extrudate pieces were dried to about 10% moisture, after which a portion of them were placed in boiling water at 212°F. for 15 minutes. Pieces of the extrudate were adjudged to have excellent structural integrity in water without disintegration. The pieces were plump, soft, and resilient in character and upon tearing tore in a manner resembling a cooked piece of meat.

EXAMPLE 7

An 800 pound mixture of a meat source and a vegetable protein source was prepared containing the following weight percentage of ingredients.

| Ingredient | Weight % |
|---|---|
| Soybean Protein Isolate (95% protein) | 34.5 |
| Raw ground Liver | 65 |
| Sulfur | .3 |
| Iron Oxide | .165 |

The mixture was placed in a preconditioner apparatus maintained at about 195°F. and the moisture level raised to the indicated level. The mixture at this stage thus had the following analysis.

| | % |
|---|---|
| Fat | 1.8 |
| Protein | 44.3 |
| Moisture | 47.2 |

The dampened mass was then hand fed into an extruder operating at 350°F. and extruded as set forth in Example 5. Pieces of the extrudate were dried to about 10% moisture and then placed in boiling water at 212°F. for 15 minutes. The pieces of extrudate retained their structural identity in the boiling water and visually resembled cooked pieces of meat. Upon tearing, they tore in a manner similar to that of real meat, and to the touch were soft and resilient in character.

EXAMPLE 8

Pieces of the expanded protein product produced pursuant to Example 1, containing 30% by weight of spleens with the defatted soy meal were placed in an Allo Kramer Model S-2HE Sheer Press with a 2500 pound proving ring, using a CS-1 Standard Sheer Compression Cell in order to determine the shear characteristics of the product when dry. The shear characteristics are, of course, related to the meat-like properties of a product since the higher the shear force required to tear the product, the more tough and resilient the product is. At the same time, pieces of the product produced pursuant to Example 3 in U.S. Pat. No. 3,447,929 were placed in the same device and their shear characteristics determined.

Twenty-five grams of the product of the instant invention were compared to twenty grams of the product produced pursuant to U.S. Pat. No. 3,447,929. The formula for determining shear is $$\frac{A \times B}{W}$$

where:

$W$ = weight of the sample in grams,
$B$ = number of divisions from 0 to peak obtained on the rendering device, and
$A$ = pounds of pressure value for each scale division.

Twenty different samples of each product was tested to eliminate any statistical variation between pieces. The average shear value obtained for the product of the instant invention was 109.75, while the average value for the product of U.S. Pat. No. 3,447,929 was 81.5, almost 25% less.

It may, therefore, be seen that in a dry state, the product of the instant invention has a higher degree of chewiness and resiliency as determined by its shear characteristics, while the products of the prior art do not.

Of course, if these comparative samples were cooked as set forth in Example 2, and the shear measurements then taken, there would be no value obtained from the samples of the product of U.S. Pat. No. 3,447,929, since it would have been substantially decomposed by cooking.

We claim:
1. A method for the production of a porous food product having the texture and organoleptic properties of meat comprising;
   a. forming a mixture consisting essentially of a vegetable protein containing material, and a meat source selected from the group consisting of raw meat and meat by-products in an amount of between about 5 to 80% by weight of said mixture; said mixture having a protein content on a dry basis of at least about 25% by weight;
   b. mechanically working the mixture under elevated temperatures of at least about 212°F. and elevated pressures to convert the mixture to a flowable substance; and
   c. forming an expanded, porous structure by extruding the mixture through a restricted orifice into an environment of substantially lower pressure.

2. A method as set forth in claim 1 wherein said mixture has a moisture content not exceeding about 50% by weight.

3. A method as set forth in claim 1 wherein said mixture has a fat content less than about 12% by weight.

4. A method as set forth in claim 1 wherein said elevated temperatures are between about 275° and 450°F.

5. A method as set forth in claim 1 wherein said vegetable protein containing material is an oilseed material.

6. A method as set forth in claim 5 wherein said oilseed material is a soybean material.

7. A method as set forth in claim 6 wherein said soybean material is substantially defatted.

8. A method as set forth in claim 1, including the step of drying said porous food product to equilibrium moisture content, thereby providing a dry food product which upon rehydration has the texture and organoleptic properties of meat.

9. A method for the production of a porous food product having the texture and organoleptic properties of meat comprising:
   a. forming a mixture consisting essentially of a vegetable protein containing material, and a meat source selected from the group consisting of raw meat and meat by-products in an amount of between about 5 to 80% by weight of said mixture, said mixture having a moisture content not exceeding 50% by weight, a protein content on a dry basis of at least about 25% by weight and a fat content less than about 12% by weight;
   b. mechanically working the mixture under elevated temperature of at least about 212°F. and elevated pressures to correct the mixture to a flowable substance; and
   c. forming an expanded porous structure by extruding the mixture through a restricted orifice into an environment of substantially lower pressure.

10. A method as set forth in claim 9 wherein said mixture has a moisture content of between about 20 to 50% by weight.

11. A method as set forth in claim 9 wherein said vegetable protein material comprises an oilseed material.

12. A method as set forth in claim 11 wherein said oilseed material is a soybean material.

13. A method as set forth in claim 12 wherein said soybean material is substantially defatted.

14. A method as set forth in claim 9 wherein said elevated temperatures are between about 275° and 450°F.

15. A method as set forth in claim 9, including the step of drying said porous feed product to equilibrium moisture content, thereby providing a dry food product which upon rehydration has the texture and organoleptic properties of meat.

16. The product produced by process of claim 1.

* * * * *

UNITED STATES PATENT AND TRADEMARK OFFICE
CERTIFICATE OF CORRECTION

PATENT NO. : 3,968,269
DATED : July 6, 1976
INVENTOR(S) : Bernard M. Payne et al It is certified that error appears in the above-identified patent and that said Letters Patent are hereby corrected as shown below:

Column 1, line 60 - bean-like should read "bean-like"

Column 5, line 34 - "a" should read "an"

Column 6, line 10 - "AOAC Methods of Analysis, Vol. XI" should read "AOAC Methods of Analysis, Vol. XI"

Column 12, line 39 - "feed" should read "food"

Signed and Sealed this

Twenty-sixth Day of April 1977

[SEAL]

*Attest:*

RUTH C. MASON
*Attesting Officer*

C. MARSHALL DANN
*Commissioner of Patents and Trademarks*